(12) United States Patent
Dunne et al.

(10) Patent No.: US 9,332,032 B2
(45) Date of Patent: May 3, 2016

(54) IMPLEMENTING SECURITY IN A SOCIAL APPLICATION

(71) Applicant: International Business Machines Corporation, Armonk, NY (US)

(72) Inventors: Jonathan Dunne, Waterford (IE); Jason Flood, Dublin (IE); Jeffrey B. Sloyer, Cary, NC (US); Ian D. Stewart, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/835,771

(22) Filed: Mar. 15, 2013

(65) Prior Publication Data

US 2014/0282822 A1 Sep. 18, 2014

(51) Int. Cl.
H04L 29/06 (2006.01)

(52) U.S. Cl.
CPC ............. *H04L 63/20* (2013.01); *H04L 63/102* (2013.01)

(58) Field of Classification Search
USPC ........................................................... 726/1
See application file for complete search history.

(56) References Cited

U.S. PATENT DOCUMENTS

| 8,302,015 B2 | 10/2012 | Krishnan et al. | |
| 2005/0171954 A1 | 8/2005 | Hull et al. | |
| 2005/0203929 A1 | 9/2005 | Hazarika et al. | |
| 2006/0248573 A1 | 11/2006 | Pannu et al. | |
| 2009/0144329 A1 | 6/2009 | Marlow | |
| 2009/0248882 A1 | 10/2009 | Takagi et al. | |
| 2010/0082693 A1 | 4/2010 | Hugg et al. | |
| 2010/0146118 A1* | 6/2010 | Wie | 709/225 |
| 2010/0169265 A1 | 7/2010 | Ristock et al. | |
| 2010/0332669 A1* | 12/2010 | Yang et al. | 709/229 |
| 2012/0131107 A1 | 5/2012 | Yost | |
| 2012/0158751 A1 | 6/2012 | Tseng | |
| 2012/0179764 A1 | 7/2012 | Erdal | |
| 2012/0233259 A1* | 9/2012 | Work | 709/204 |
| 2012/0311666 A1 | 12/2012 | Wouhaybi et al. | |
| 2013/0073473 A1* | 3/2013 | Heath | 705/319 |
| 2013/0091214 A1* | 4/2013 | Kellerman et al. | 709/204 |
| 2013/0091540 A1* | 4/2013 | Chen et al. | 726/1 |
| 2013/0091582 A1* | 4/2013 | Chen et al. | 726/26 |
| 2013/0268836 A1 | 10/2013 | Nimrod | |
| 2014/0067656 A1* | 3/2014 | Cohen Ganor et al. | 705/39 |

OTHER PUBLICATIONS

Security and Trust through Electronic Social Network-based Interactions| http://ieeexplore.ieee.org/stamp/stamp.jsp?tp=&arnumber=5283761|Bichsel et al.|2009|pp. 1002-1007.*
User Interactions in Social Networks and their Implications|http://www-dev.ccs.neu.edu/home/cbw/5750/papers/interaction-eurosys09.pdf|Wilson et al.|pp. 1-14|2009.*
IPCOM000191430D, "Share Cloud Compute Resources Based on Friend Status/Requests in Social Communities", Published Jan. 4, 2010, 4 pages including cover page.

* cited by examiner

*Primary Examiner* — Mahfuzur Rahman
(74) *Attorney, Agent, or Firm* — Steven L. Nichols; Fabian VanCott (57) ABSTRACT

Implementing security in social applications includes inferring a closeness level of a connection to a user's profile of a social application based on a closeness policy and implementing a security level individualized to the connection based on the closeness level.

18 Claims, 5 Drawing Sheets

IMPLEMENTING SECURITY IN A SOCIAL APPLICATION

BACKGROUND

The present invention relates to implementing security in social applications, and more specifically, implementing security individualized for each connection in a user's profile of a social application.

Social applications allow users to create a profile about themselves that can connect to the profiles of other users. Users of such applications generally access the social application through a website or intranet page through a client device. Hardware and program instructions for operating the social application are generally located elsewhere on a network and the user accesses the social application remotely. A user can communicate with his connections through the features of the social application.

BRIEF SUMMARY

A method for implementing security in social applications includes inferring a closeness level of a connection to a user's profile of a social application based on a closeness policy and implementing a security level individualized to the connection based on the closeness level.

A system for implementing security in social applications includes an inference engine to infer a closeness level of a connection to a user's profile of a social application based on a closeness policy, a security implementation engine to implement a security level individualized to the connection based on the closeness level, and a monitoring engine to monitor communications between the user's profile and the connection.

A computer program product for implementing security in social applications includes a tangible computer readable storage medium, the tangible computer readable storage medium having computer readable program code embodied therewith, the computer readable program code having program instructions that, when executed, causes a processor to infer a closeness level of a connection to a user's profile of a social application based on a closeness policy, implement a security level individualized to the connection based on the closeness level, monitor communications between the user's profile and the connection, and adjust the closeness level in response to real time monitoring of the communications.

A system for implementing security in social applications includes an inference engine to infer a closeness level of a connection to a user's profile of a social application based on a closeness policy, a security implementation engine to implement a security level individualized to the connection based on the closeness level, a monitoring engine to monitor communications between the user's profile and the connection, an adjusting engine to adjust the closeness level in response to real time monitoring of the communications, a removing engine to remove the connection based on a behavior of the connection and the closeness level, and a threshold determination engine to determine a closeness level threshold where connections are removed from the user's profile in response to falling below the closeness level threshold.

A method for implementing security in social applications includes inferring a closeness level of a connection to a user's profile of a social application based on a closeness policy, implementing a security level individualized to the connection based on the closeness level, monitoring communications from the connection in real-time, adjusting the closeness level based on the communications from the connection monitored in real-time, and removing the connections from the user's profile in response to the closeness level of the connection being below a predetermined threshold.

DETAILED DESCRIPTION

The present specification describes a method and system for implementing security individualized to connections in a user's profile in a social application.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A user can communicate through the social application with his connections. For example, the social application may provide an option for the user to communicate with his connections via email, video conferencing, audio conferencing, instant messaging, other forms of communication, or combinations thereof. The user generally has multiple connections, each with a different type of relationship with the user. For example, the user may be connected to family members, close friends, work colleagues, friends of friends, fans, or other types of relationships. However, despite the varying types of relationships, and thus, different levels of trust, social applications provide a single level of security that is the same for all of the connections. The principles described herein provide a method for implementing a level of security individualized for each connection in a user's profile of a social application. The method includes inferring a closeness level of a connection to a user's profile of a social application based on a closeness policy and implementing a security level individualized to the connection based on the closeness level.

Figure 1:
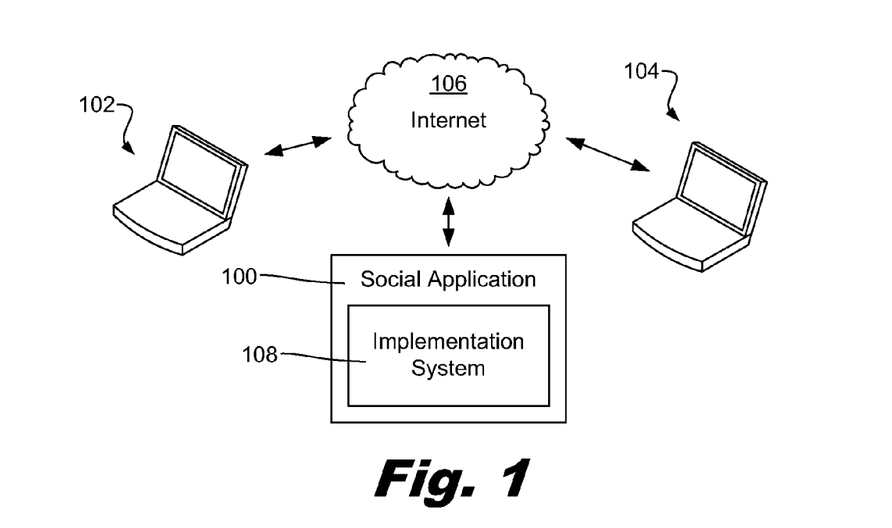
FIG. 1 is a diagram of an example of a social application in communication with client devices according to one example of the principles described herein.

Referring now to the figures, FIG. 1 is a diagram of an example of a social application (100) in communication with client devices (102, 104). In this example, the social application (100) is in communication with client devices (102, 104) remotely over the internet (106). The social application (100) has an implementation system (108) that implements a level of security individualized for each connection in a user's profile.

The client devices (102, 104) may be any appropriate client device with a user interface that allows the user to have access to the social application (100) over the internet (106). For example, the client devices (102, 104) may be personal computers, laptops, desktops, mobile devices, phones, tablets, watches, personal digitized devices, other client devices, or combinations thereof. Each of the client devices (102, 104) includes a user interface that allows the user to interact with the social application. Any appropriate user interface may be used. For example, the user interface may be a graphical user interface, a key board interface, a touch screen interface, an auditory interface, a voice recognition interface, a motion detection hand gesture interface, another type of user interface, or combinations thereof.

The social application (100) includes profiles of users who subscribe to the services of the social application (100). A user can create a profile by entering his information into the social application (100). The user can control to which other profiles of the social application (100) the user is connected by requesting to connect to another user's profile or accepting such requests.

Each of the connections to which the user's profile is connected involves a relationship between the user and his contact. For example, the user may be connected to family members, close friends, work colleagues, friends of friends, fans, other types of relationships, or combinations thereof. The user will have varying amounts of trust with each of his connections. For example, a user may trust that the links in emails sent by a close friend or family member are safe to open. However, the user may not trust the links in emails sent from connections that have a distant relationship with the user.

The implementation system (108) can infer the level of closeness between the user and each of his connections and accordingly assign an appropriate security level customized for each connection. For example, during the process of establishing a connection between the user and a close family member, the user or the family member may indicate that the user and the connection are related. In response to receiving such an input, the implementation system (108) determines that the family member's connection is to be assigned a default closeness score for family members. In some examples, such a default closeness score for a family member is between 0.75 and 0.85 where 1.0 represents the maximum closeness score and 0.0 represents the lowest possible closeness score.

In other examples, the implementation system (108) uses other factors to determine which closeness score to assign to a new connection. For example, if the user inputted into the social application (100) the names of his family members and one of his family members requested to establish a connection, the implementation system (108) may infer that the connection request is from a family member and accordingly assign the default closeness score for a family member. In other examples, the implementation system (108) considers other information already inputted into the user's profile and the profile of the requesting connection. For example, if the requesting connection has multiple connections that are already connected to the user and both the user and the connection each have high closeness scores with these mutual connections, the implementation system (108) can infer that the requesting connection is a close friend and accordingly assign a default closeness score for close friends. In some examples, the implementation system (108) infers a certain amount of trust if the user is the one requesting to make the connection.

A closeness policy contains rules for determining the initial closeness level to assign to a connection. The closeness policy can consider multiple factors when determining the closeness score to assign to the connection. In some examples, the policy includes at least one weighted factor that is more dispositive than other factors in determining which closeness score to assign. One factor that may determine an initial score is whether the connection is already connected to a follower, family member, close friend, friend or friend, other connection with a different classification, the number of mutual connections, another factor, or combinations thereof. For example, if a connection is already connected to a close family member of the user, the initial closeness score may be higher than if the connection is already connected to just a fan that is hardly acquainted with the user.

In response to determining the closeness level of the connection and the user's profile, the implementation system (108) determines the appropriate level of security to implement between the user's profile and the connection. A security policy may indicate that predetermined ranges of the closeness score merits predetermined levels of security. For example, the closeness score assigned to family members may be assigned a security level that involves no or very little security. On the other hand, a security level assigned a closeness score associated with a friend of a friend may include implementing spam filtering, blocking suspicious links, keyword filtering, other security implementations, or combinations thereof.

The implementation system (108) may request feedback from the user for the defaulted closeness score or associated security level. If the user indicates that such a closeness level or security level is appropriate, the implementation system (108) implements the security level associated with the inferred closeness level. On the other hand, if the user requests a different closeness level or a different level of security, the implementation system (108) can change the closeness score or security level as requested by the user. In other examples, the determination of the closeness level and the security level are transparent to the user. As a general rule, when the closeness level is higher, the security level is lower. Similarly, when the closeness level is lower, the security level is higher.

The implementation system (108) monitors communications between the user's profile and each of the connections.

The closeness policy may indicate to change the closeness level based the behavior of the connection. For example, the closeness policy may indicate the closeness level is to increase in response to frequent communications between the user and the connection. In such an example, an equation may be applied to determined how much of a closeness increase to give based on the how frequent the communications are. Further, the closeness policy may also indicate that certain types of communication between the user and the connection also increase the closeness level. For example, video conferencing between the user and the connection may result in a higher closeness score than merely commenting on user's blog posts. In some examples, the closeness policy also considers whether the user is initiating the communications with the connection. For example, the closeness level for a connection may increase more if the user is commenting on the connection's blog posts than if the connection is commenting on the user's blog posts.

The closeness policy may also indicate that the closeness score is to be decreased based on the user's behavior. For example, if the connection infrequently communicates with the user, the closeness level may decrease. Further, if the implementation system (108) recognizes abusive keywords in communications from the connection, the closeness score may also drop. Depending on the type of abusive behavior, the connection may be removed from the user's profile for a single occurrence. In other examples, the user may be removed for multiple occurrences of abusive behavior. Depending on the type of abusive behavior, the connection can be removed without lowering his closeness level. In other examples, the closeness level is decreased and the connection is just removed if the closeness level drops below a predetermined threshold. The predetermined threshold may be set at a level determined by the implementation system (108) or the user may provide input to determine the closeness value of the predetermined threshold.

Figure 2:
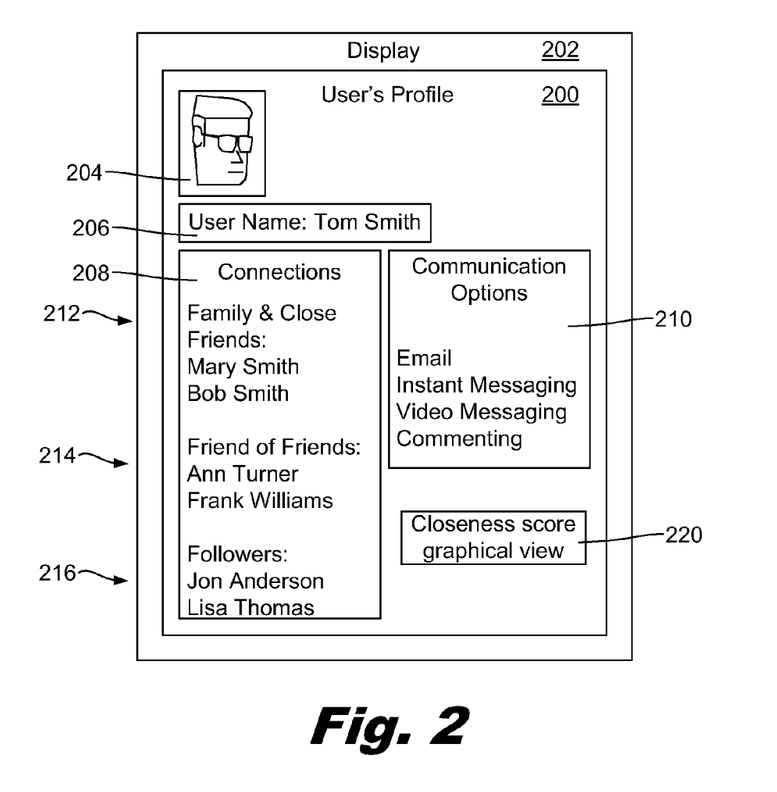
FIG. 2 is a diagram of an example of a user's profile according to one example of the principles described herein.

FIG. 2 is a diagram of an example of a user's profile (200). In this example, the user's profile (200) is displayed in a display (202) of a monitor of a client device. The user's profile (200) includes an image (204) of the user, a name (206) of the user, connections (208), and communication options (210). While this example is described with reference to specific features of a user's profile, any appropriate features may also be incorporated into the user's profile and/or social application.

In this example, the connections are separated into different categories (212, 214, 216). While this example is depicted with three specific categories (212, 214, 216), any appropriate number and/or type of categories may be used in accordance with the principles described herein. The first depicted category (212) is a family and close friends category. The second depicted category (214) is a friend of a friend category. The connections in the second category (214) include those connections who are not close friends, but are individuals that the user knows through his friends. These connections may be people that the user has met or just knows about through his close friends. The third depicted category (216) is a follower category. A follower includes someone that the user does not know personally, but has a reason to follow the activities of the user. For example, if the user is a researcher or an athlete that generates news of interest to an individual, the individual can request to form a connection with the user.

The implementation system assigns a default closeness score to each of the connections. However, the implementation system monitors the activity between the user and the connection to determine whether the closeness level, and thereby the security level, should be adjusted. Further, the categories in which a connection falls into can be changed over time. For example, a follower may correspond with the user and such correspondence may develop into a friendship. Such a connection may progressively advance from the follower category (216) to the close friend category (212). In some examples, the user has an ability to modify in which category the connection falls, which accordingly modifies the connection's implemented security level.

The social application also provides different communication options (218) through the user's profile (200). In this example, the communication options (218) include emailing, instant messaging, video messaging, and commenting on blog posts. The user may utilize these options to communicate with the connection. In some examples, the type of communication option selected to communicate between the user and the connection affect the closeness score. For example, video conferencing between the user's profile (200) and the connection may cause a significant increase in a closeness level whereas commenting on a blog posting may cause a negligible increase or no increase in a closeness level.

In the example of FIG. 2, the user's profile (200) also includes a link (220) to a graphical view of the closeness scores of the user's connections. In other examples, other appropriate mechanisms for communicating to the user the closeness scores of his connections are used in accordance with the principles described herein. In other examples, the closeness scores are not displayed to the user.

While this example has been described with reference to a specific layout and features of a user's profile, any appropriate layout or features of a user's profile may be used in accordance with the principles described herein. For example, the additional personal information may be included in the user's profile. Such personal information may be viewable to the user's connections. Such personal information may include likes, dislikes, work experience, phone numbers, home address, work address, images posted by the user, family information, educational background, achievements, other information, or combinations thereof. However, in some examples, as the level of security increases for specific connections, the amount of information available to that connection may also decrease.

Figure 3:
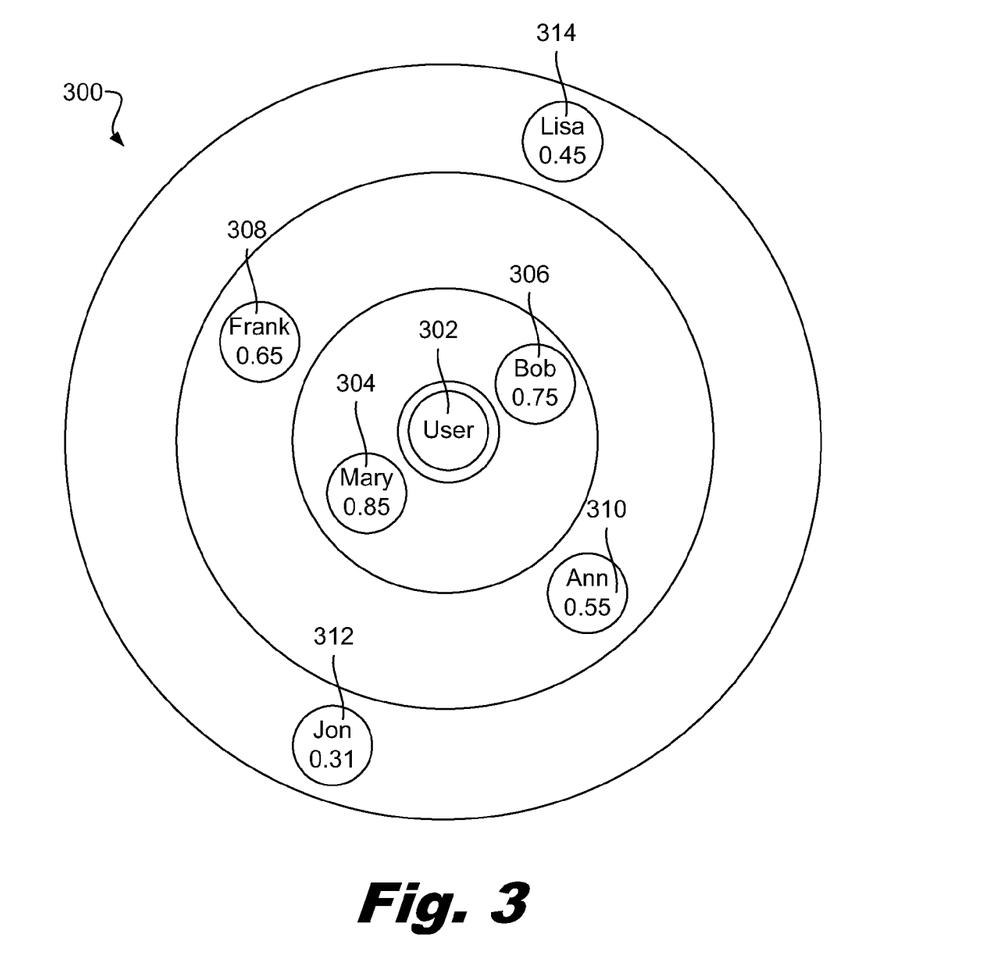
FIG. 3 is a diagram of an example of a graphic that displays closeness scores assigned to connections according to one example of the principles described herein.

FIG. 3 is a diagram of an example of a graphic (300) that displays closeness scores assigned to connections. In this example, the user (302) is centered within the graphic (300) and the user's connections are spaced apart from the user (302) by a distance proportional to each connection's closeness score. The social application may provide the user an option in the user's profile to view the user's connections according to their closeness level in a graphic (300) as depicted in FIG. 3. However, any appropriate graphic or other mechanism for communicating to the user the varying closeness levels may be used in accordance to the principles described herein.

In this example, the connections that belong to the first category (212, FIG. 2) are located proximate to the user (302). Thus, connections Bob (304) and Mary (306) are located proximate the user (302). Bob (304) has a closeness score of 0.75, and Mary (306) has a closeness score of 0.85. Both Bob (304) and Mary (306) are classified as being family members or close friends to the user (302) by virtue of being included in the first category (212, FIG. 2). Even though Bob (304) and Mary (306) are in the same category, their closeness scores are different.

The difference may be due to the interactions discovered by the implementation system as the implementation system monitors communications between the user's profile and the connections and adjusts the closeness score in real time. As a result, the level of security between Bob (304) and the user (302) changes in real time based on the adjustments made to Bob's closeness score. Likewise, the level of security between Mary (306) and the user (302) changes in real time based on the adjustments made to Mary's closeness score. As a result, despite having the same classification, Bob (304) and Mary (306) have different levels of security. For example, Bob's security may include light keyword blocking, while Mary's security level implements no security mechanisms. Bob's and Mary's similar classification may cause Bob (304) and Mary (306) to have similar default closeness scores assigned to them when they initially become connections. However, as the implementation system monitors their communications and/or other interactions, their closeness score is modified in real time.

Connections Frank (308) and Ann (310) belong to the second category (214, FIG. 2), and are thus classified as friends of a friend. Frank (308) has a closeness score of 0.65, and Mary (310) has a closeness score of 0.55. Frank (308) and Ann (310) also have different levels of security that are individualized based on their closeness score. Since the closeness level of Frank (308) and Ann (310) are lower than the closeness level of Bob (304) and Mary (306), Frank (308) and Ann (310) are spaced a farther distance from the user (302). Also, since the closeness level of Frank (308) and Ann (310) are lower than the closeness level of Bob (304) and Mary (306), Frank (308) and Ann (310) have a higher level of security. For example, Frank (308) and Ann (310) may additionally have spam filtering and audio & video attachment scans, whereas such security mechanisms are not implemented for Bob (304) and Mary (306).

Connections Jon (312) and Lisa (314) belong to the third category (216, FIG. 2), and are thus classified as followers. Jon (312) has a closeness score of 0.31, and Lisa (314) has a closeness score of 0.45. Jon (312) and Lisa (314) also have different levels of security that are individualized based on their closeness score. Since the closeness level of Jon (312) and Lisa (314) are lower than the closeness level of Frank (308) and Ann (310), Jon (312) and Lisa (314) are spaced a farther distance from the user (302). Also, since the closeness level of Jon (312) and Lisa (314) are lower than the closeness level of Frank (308) and Ann (310), Jon (312) and Lisa (314) have a higher level of security. For example, Jon (312) and Lisa (314) may additionally have extensive keyword filtering whereas the security implementation for Frank (308) and Ann (310) applies just light keyword filtering or moderate keyword filtering.

Figure 4:
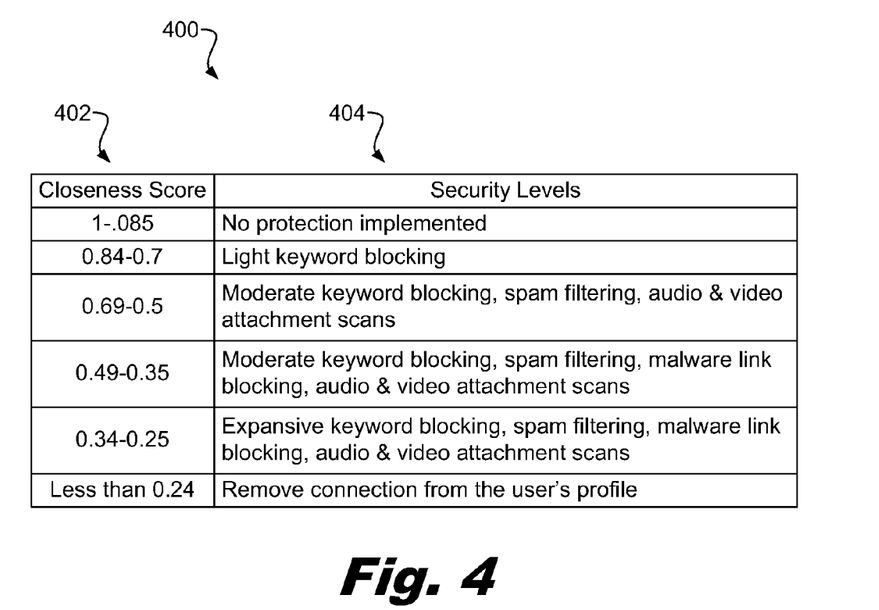
FIG. 4 is a chart of an example of security levels according to one example of the principles described herein.

FIG. 4 is a chart (400) of an example of security levels. A first column (402) of the chart (400) represents closeness score ranges, and a second column (404) represents corresponding security levels. While this example is described with reference to specific closeness scores corresponding to specific levels of security, any appropriate correlation between the closeness level and the security level may be implemented. For example, the closeness score may correspond to a proportional increase in security as the closeness score increases. In other examples, the closeness score may correspond to an exponential increase in security as the closeness score increases. In other examples, the closeness score ranges corresponding to increases in the security level may be different than depicted in the example of FIG. 4.

In the illustrated example, a closeness score range of 1.0 to 0.85 corresponds to no protection implemented. A closeness score range of 0.84 to 0.7 corresponds to just light keyword blocking. A closeness score range of 0.69 to 0.5 corresponds to moderate keyword blocking, spam filtering, and audio & video attachment scans. A closeness score range of 0.49 to 0.35 corresponds to moderate keyword blocking, spam filtering, malware link blocking, and audio & video attachment scans. A closeness score range of 0.34 to 0.25 corresponds to expansive keyword blocking, spam filtering, malware link blocking, and audio & video attachment scans. If the closeness score range is 0.25 or less, the security implementation causes the connection to be removed.

In some examples, other corrective actions from dropping below the threshold may result rather than just removing the connection. For example, instead of removing the connection from the user's profile, the connection may receive a warning from the social application. If such warnings are unheeded, the social application may remove the user. In other situations, the social application may request feedback from the user before removing one of the user's connections. In some cases, the social application may request permission to remove a connection.

The social application may send a notification to the user when a connection is removed. In other examples, the removal may be transparent to the user. Further, after removal, the connection may be banned from establishing a connection with the user. Such a ban may be permanent or just for a temporary time period. In some examples, the user gives express permission for a connection to be reestablished with a removed connection.

The connection may be removed from the user's profile by merely delisting the connection on the user's profile. Such a removal may negatively affect the connection's closeness score with other connections depending on the reasons for removal. Some removal policies may prevent removal from the user's contact list if no abusive behavior occurs. In other words, in these examples, a connection is not removed from the contact list for merely infrequent communications.

In other examples, the connection is removed from the user's profile by freezing activity between the user and the connection. In other examples, if abusive behavior occurs, the connection's account with the social application may be completely or partly deactivated.

The same level of security may be implemented to both the user and the connection. Thus, the security policy may protect the connection as much as the user. In such an example, a single closeness score may be associated with both the user and the connection. As a result, the user's activities or the connection's activity both affect the single closeness score and results in security changes for both the user and the connection.

In other examples, the security policy is one way. For example, the user may have a high closeness score from the connection's perspective because the user has never used abusive language. On the other hand, from the user's perspective, the connection may have a low closeness score because the connection uses abusive language in his communications to the user. Thus, the user will have higher security implemented on the communications from the connection than the connection will have on communications from the user.

While this example has been described with reference to specific types of security implementations, any appropriate security implementation may be used in accordance to the principles described herein. Further, while this example has been described with reference to a specific number of closeness level ranges, any number of closeness ranges may be used in accordance with the principles described herein.

Figure 5:
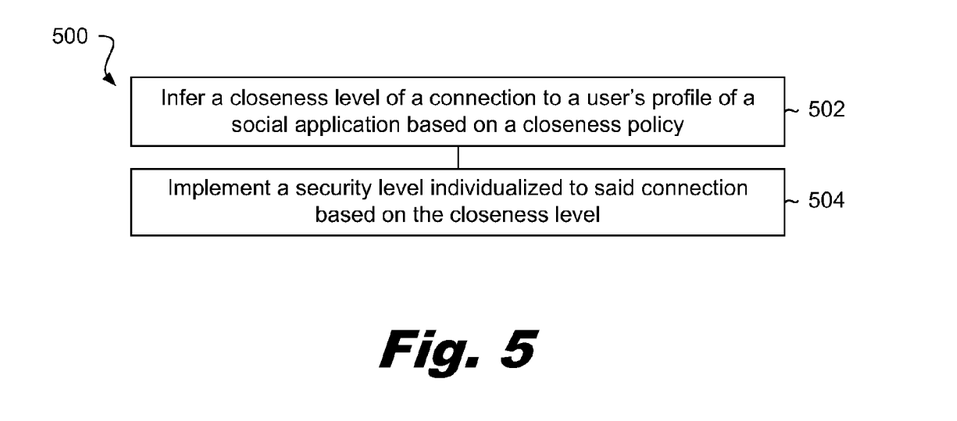
FIG. 5 is a diagram of an example of a method for implementing security in social applications according to one example of the principles described herein.

FIG. 5 is a diagram of an example of a method (500) for implementing security in social applications. In this example, the method (500) includes inferring (502) a closeness level of a connection to a user's profile of a social application based on a closeness policy and implementing (504) a security level individualized to the connection based on the closeness level.

The closeness policy may consider any appropriate factor when determining a closeness level. For example, the closeness policy may consider a frequency of communication between the connection and the user's profile through the social application. Another factor that the closeness policy can consider is a type of communication between the connection and the user's profile through the social application. Another factor may include the subject matter of the communications between the connection and the user's profile. Subject matter used in communications from the connection that may lower the closeness level may include abusive language, keywords indentified by the user, suspicious phrases, suspicious links, other subject matter, or combinations thereof. In some example, subject matter in communications from connections may increase the closeness score. For example, subject matter indentified by the user, subject matter that relates to personal or family matters, complimentary subject matter, subject matter that relates to interests or personal information in the user's profile, other subject matter, or combinations thereof.

Also, the closeness policy may include a classification of the connection in the social application. Such classifications may include family member, close friend, friend of a friend, follower, other classification, or combinations thereof.

The closeness level can be represented with a closeness score. The method may further include assigning a closeness score based on the closeness level to each connection. The closeness level may be conveyed in any appropriate manner, such as with numbers, colors, graphics, other scoring mechanisms, or combinations thereof. In some examples, the closeness score of the closeness level is a numerical value between 1.0 and 0.0 where 1.0 represents a highest closeness level and 0.0 represents a lowest closeness level.

The security level implemented for each connection is based on the closeness score. Less restrictive security levels are assigned to connections with high closeness levels while higher restrictive security levels are assigned to connections with low closeness levels. The higher restrictive security levels may block communications from the user's profile that would otherwise be permitted if the security level were lower.

The method may further include monitoring the communications between the user's profile and the connection and adjusting the closeness level based on the communications from such monitoring. For example, if there are frequent communications between the user and the connection, the closeness level assigned to the connection may be increased according to the closeness policy.

The connection may be removed from the user's profile in response to either achieving a low score that falls below a predetermined closeness threshold or to an abusive act that the merits removal. For example, the user may indicate which actions merit automatic removal from the user's profile. In other examples, abusive behavior merely causes the closeness score to decrease below the predetermined threshold that indicates a connection is to be removed. A single abusive communication and/or behavior may cause the connection's closeness score to drop below the predetermined threshold and be removed. In other examples, multiple abusive communications will cause the connection's closeness score to drop low enough to merit removal. The user may have the option of adjusting the predetermined threshold to fit the user's preferences. The predetermined threshold may be at different levels for connections that are classified differently. For example, a user may specify that family members are to never be removed from the user's profile, while still allowing the security level to be increased as the closeness level drops. However, the user can specify that followers should be removed with minimal abusive behavior.

In some examples, abusive behavior of the connection may cause the closeness score to drop even though the abusive behavior was not directed to the user. For example, if the connection is abusive to other members of the social application or other connections of the user, the closeness score may decrease to reflect the connection's risk.

Figure 6:
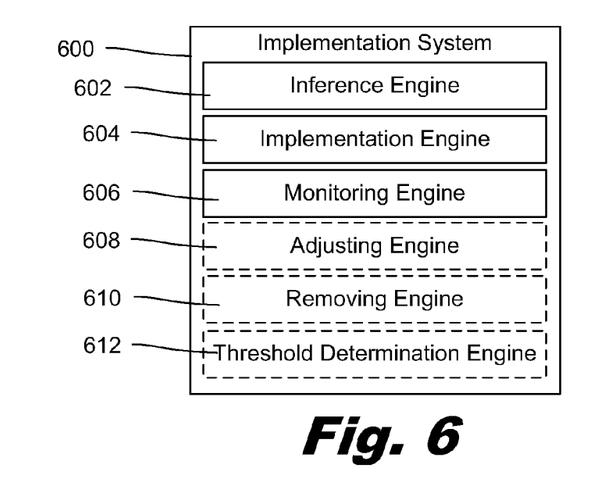
FIG. 6 is a diagram of an example of an implementation system according to one example of the principles described herein.

FIG. 6 is a diagram of an example of an implementation system (600). The implementation system (600) includes an inference engine (602), an implementation engine (604), and a monitoring engine (606). In the example of FIG. 6, the implementation system (600) also includes an adjusting engine (608), a removing engine (610), and a threshold determination engine (612). The engines (602, 604, 606, 608, 610, 612) refer to a combination of hardware and program instructions to perform a designated function. Each of the engines (602, 604, 606, 608, 610, 612) may include a processor and memory. The program instructions are stored in the memory and cause the processor to execute the designated function of the engine.

The inference engine (602) infers the closeness level between the user's profile and the connection. The implementation engine (604) implements the level of security based on the closeness score. The monitoring engine (606) monitors the communications between the user's profile and the connection. The adjusting engine (608) adjusts the closeness level of the connection based on the monitored communications. A removing engine (610) removes the connection from the user's profile in response to the connection's closeness score dropping below a closeness threshold. The threshold determination engine (612) determines the value of the closeness level to assign as the threshold. The threshold determination engine (612) may consider input from the user when determining the threshold.

Figure 7:
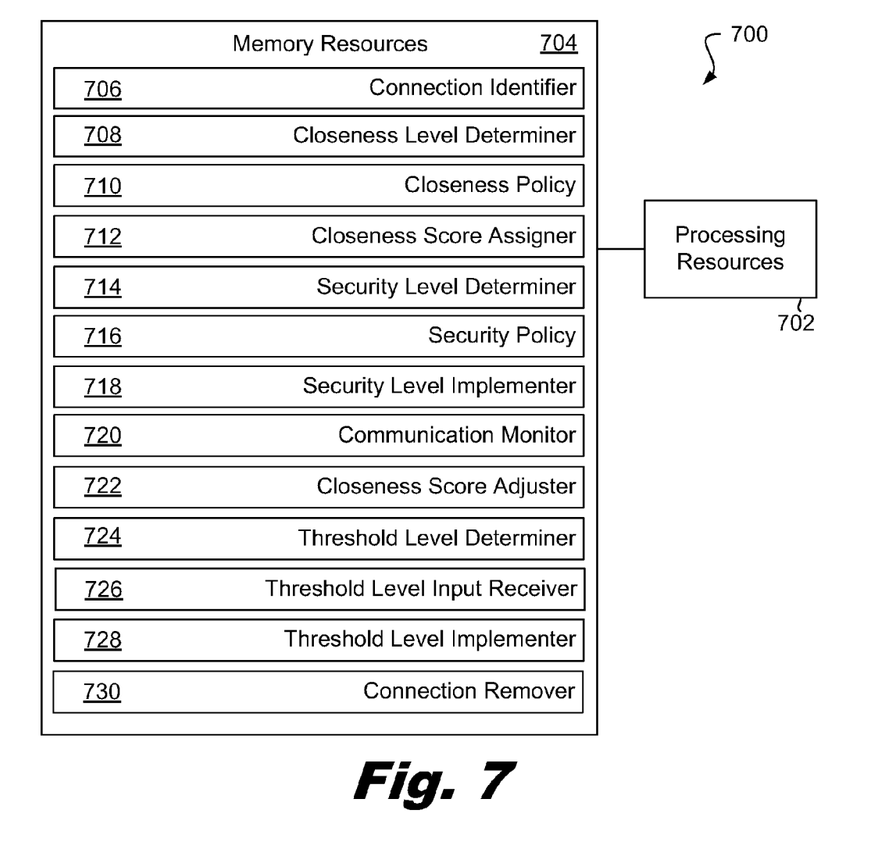
FIG. 7 is a diagram of an example of an implementation system according to one example of the principles described herein.

FIG. 7 is a diagram of an example of an implementation system (700) according to one example of the principles described herein. In this example, the implementation system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the implementation system (700). The programmed instructions shown stored in the memory resources (704) include connection identifier (706), a closeness level determiner (708), a closeness score assigner (712), a security level determiner (714), a security level implementer (718), a communication monitor (720), a closeness score adjuster (722), a threshold level determiner (724), threshold level input receiver (726), a threshold level implementor (728), and a connection remover (730). The data structures shown stored in the memory resources (704) include a closeness policy (710), and a security policy (716).

The memory resources (704) include a computer readable storage medium that contains computer readable program code to cause tasks to be executed by the processing resources (702). The computer readable storage medium is a tangible storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, or types of memory, or combinations thereof.

The connection identifier (706) represents programmed instructions that, when executed, cause the processing resources (702) to identify connections to a user's profile. The closeness level determiner (708) represents programmed instructions that, when executed, cause the processing resources (702) to determine the connection's closeness level of the connection to the user according to the closeness policy (710). The closeness score assigner (712) represents programmed instructions that, when executed, cause the processing resources (702) to assign a closeness score to the connection based on the connection's closeness level.

The security level determiner (714) represents programmed instructions that, when executed, cause the processing resources (702) to determine the level of security to be implemented for each connection according to the security policy (716). The security level implementer (718) represents programmed instructions that, when executed, cause the processing resources (702) to implement the security level to each of the connections as determined by the security level implementer (718).

The communications monitor (720) represents programmed instructions that, when executed, cause the processing resources (702) to monitor communications between the user's profile and the connection. The closeness score adjuster (722) represents programmed instructions that, when executed, cause the processing resources (702) to adjust the closeness score based on the monitored communications and the closeness policy (710).

The threshold level determiner (724) represents programmed instructions that, when executed, cause the processing resources (702) to determine the closeness value to be the threshold for removing connections that fall behind the threshold. The threshold level input receiver (726) represents programmed instructions that, when executed, cause the processing resources (702) to receive input from the user about what closeness score to set the threshold level at. The threshold level implementer (728) represents programmed instructions that, when executed, cause the processing resources (702) to implement the threshold at the determine closeness value. The connection remover (730) represents programmed instructions that, when executed, cause the processing resources (702) to remove connections that fall below the threshold level.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries and may be accessed from a remote location over a network connection while the programmed instructions are located locally. Thus, the implementation system (700) may be implemented on a user device, on a server, on a collection of servers, or combinations thereof.

The implementation system (700) of FIG. 7 may be part of a general purpose computer. However, in alternative examples, the implementation system (700) is part of an application specific integrated circuit.

Figure 8:
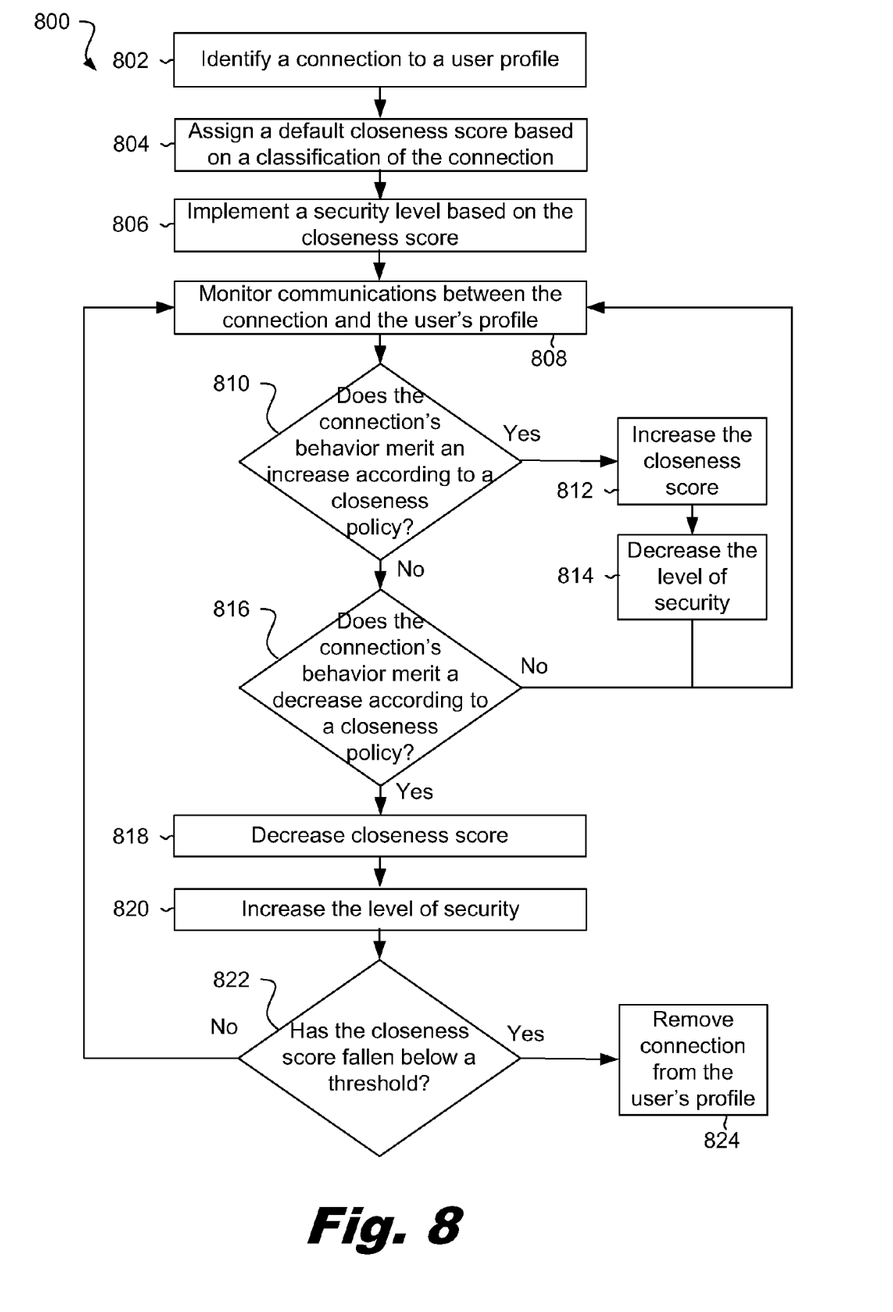
FIG. 8 is a diagram is an example of a flowchart of a process for implementing security in a social application according to one example of the principles described herein.

FIG. 8 is a diagram is an example of a flowchart (800) of a process for implementing security in a social application. In this example, the process includes identifying (802) a connection to a user's profile and assigning (804) a default closeness score based on a classification of the connection. The classification may be a family member, a close friend, a friend of a friend, a follower, a work colleague, a classmate, another individual in a different classification, or combinations thereof.

A security level is implemented (806) based on a closeness score. The communications between the user's profile and the connections are monitored (808). The process also includes determining (810) whether the connection's behavior merits an increase according to a closeness policy. If the connection's behavior merits an increase, the closeness score is increased (812) and the level of security implemented for that connection is decreased (814). After such an adjustment, the communications between the user and connection are continued to be monitored (808).

The process also includes determining (816) whether the connection's behavior merits a decrease according to the closeness policy. If the connection's behavior merits a decrease, the closeness score is decreased (818) and the level of security implemented for that connection is increased (820). After such an adjustment, the process includes determining (822) whether the closeness score has fallen below a threshold. If the closeness score has fallen below the threshold, the connection is removed (824) from the user's profile. On the other hand, if the closeness score has not fallen below a threshold, the communications between the user's profile and the connection is monitored (808).

While the examples above have been described with reference to specific mechanisms for determining the threshold level, any appropriate mechanism for determining the threshold level may be used. Further, while the examples above have been described with reference to specific ways of inferring a closeness score, any appropriate mechanism for determining the closeness score may be used in accordance to the principles described herein. Also, while the examples above have been described with reference to specific mechanisms for implementing the security levels, any appropriate mechanism for implementing the security levels may be used in accordance to the principles described herein.

While the examples above have been described with reference to specific mechanisms for determining an initial closeness score when the connection is established with the user's profile, any appropriate mechanisms for determining initial closeness scores may be used. Further, while the examples above have been described with reference to specific mechanisms for monitoring communications and adjusting the closeness score, any appropriate mechanisms for monitoring communications and adjusting closeness scores may be used in accordance with the principles described herein.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A system for implementing security in social applications, comprising processing resources communicating with hardware memory resources to implement:
    an inference engine to infer a closeness level of a connection to a user's profile of a social application based on a closeness policy;
    a security implementation engine to implement a security level individualized to said connection based on said closeness level;
    a monitoring engine to monitor communications between said user's profile and said connection; and
    a threshold determination engine to determine a closeness level threshold where connections are removed from said user's profile in response to falling below said closeness level threshold.

2. The system of claim 1, further comprising an adjusting engine to adjust said closeness level in response to real time monitoring of said communications.

3. The system of claim 1, further comprising a removing engine to remove said connection based on a behavior of said connection and said closeness level.

4. The system of claim 1, wherein said closeness policy considers a frequency of communication between said connection and said user's profile through said social application, a type of communication between said connection and said user's profile through said social application, subject matter in communications between said connection and said user's profile through said social application, and a classification of said connection in said social application.

5. A computer program product for implementing security in social applications, comprising:
    a non-transitory computer readable storage medium, said tangible computer readable storage medium comprising computer readable program code embodied therewith, said computer readable program code comprising program instructions that, when executed, causes a processor to:
    infer a closeness level of a relationship between a user and a person listed as a connection in the user's profile of a social application based on a closeness policy, wherein said inferring a closeness level includes categorizing said person into one a number of defined groups based on relationship to said user and assigns a default closeness level for the corresponding group to said relationship between said user and said person;
    implement a security level individualized to said person listed as a connection, the security level implemented being determined based on said closeness level;
    monitor communications between said user and said person listed as a connection; and
    adjust said closeness level in response to real time monitoring of said communications.

6. The computer program product of claim 5, further comprising computer readable program code comprising program instructions that, when executed, causes said processor to remove said connection based on a behavior of said person and said closeness level.

7. The computer program product of claim 5, further comprising computer readable program code comprising program instructions that, when executed, causes said processor to adjust said closeness level based on said communications from said connection monitored in real-time.

8. The computer program product of claim 5, wherein said closeness policy considers a frequency of communication between said person listed as a connection in said user's profile and said user through said social application, a type of said communication, subject matter in said communication, and a classification of said connection in said social application.

9. The computer program product of claim 5, further comprising computer readable program code comprising program instructions that, when executed, causes said processor to:
   implement a higher restrictive security level if said connection has a low closeness level; and
   implement a less restrictive security level if said connections has a high closeness level.

10. A system for implementing security in social applications, comprising processing resources communicating with hardware memory resources to implement:
   an inference engine to infer a closeness level of a relationship between a user and a person listed as a connection in the user's profile of a social application, said inference engine inferring the closeness level based on a closeness policy;
   a security implementation engine to implement a security level individualized to said person listed as a connection, the security level implemented being determined based on said closeness level;
   a monitoring engine to monitor communications between said user and said person listed as a connection;
   an adjusting engine to adjust said closeness level in response to real time monitoring of said communications;
   a removing engine to remove said connection from said user's profile based on a behavior of said person listed as a connection and said closeness level; and
   a threshold determination engine to determine a closeness level threshold where connections are removed from said user's profile in response to falling below said closeness level threshold;
   wherein said inference engine classifies the person listed as a connection into one of a plurality of groups defined by different relationships to said user, the closeness level assigned to the person being determined based on in which of said plurality of groups the person is classified.

11. A system for implementing security in social applications, comprising processing resources communicating with hardware memory resources to implement:
   an inference engine to infer a closeness level of a relationship between a user and a person listed as a connection in the user's profile of a social application, said inference engine inferring the closeness level based on a closeness policy;
   a security implementation engine to implement a security level individualized to said person listed as a connection, the security level implemented being determined based on said closeness level; and
   a monitoring engine to monitor communications between said user and said person listed as a connection; and
      an adjusting engine to adjust said closeness level in response to real time monitoring of said communications.

12. The system of claim 11, further comprising a removing engine to remove a connection with said person from said user's profile based on a behavior of said person and said closeness level.

13. The system of claim 12, wherein said removing engine imposes a ban on said person from forming a new connection with said user.

14. The system of claim 11, wherein said adjusting engine decreases a security level implemented for said person based on behavior indicative of an increase in said closeness level between said person and said user.

15. The system of clam 11, wherein said interference engine categorizes said person into one a number of defined groups based on relationship to said user and assigns a default closeness level for the corresponding group to said person.

16. The system of claim 15, further comprising a display device on which said processing resources display a graphic comprising concentric circles, each representing one of said defined groups with distance from a center of said concentric circles indicating a lower closeness level to said user.

17. The system of claim 15, wherein different closeness levels are assigned to different members of the same group.

18. The system of claim 11, wherein the security implementation engine obtains confirmation from said user for the closeness level or security level implemented for said person.

\* \* \* \* \*